April 10, 1934.  M. J. STANTON  1,954,685
BEARING LUBRICATOR
Filed Jan. 18, 1930
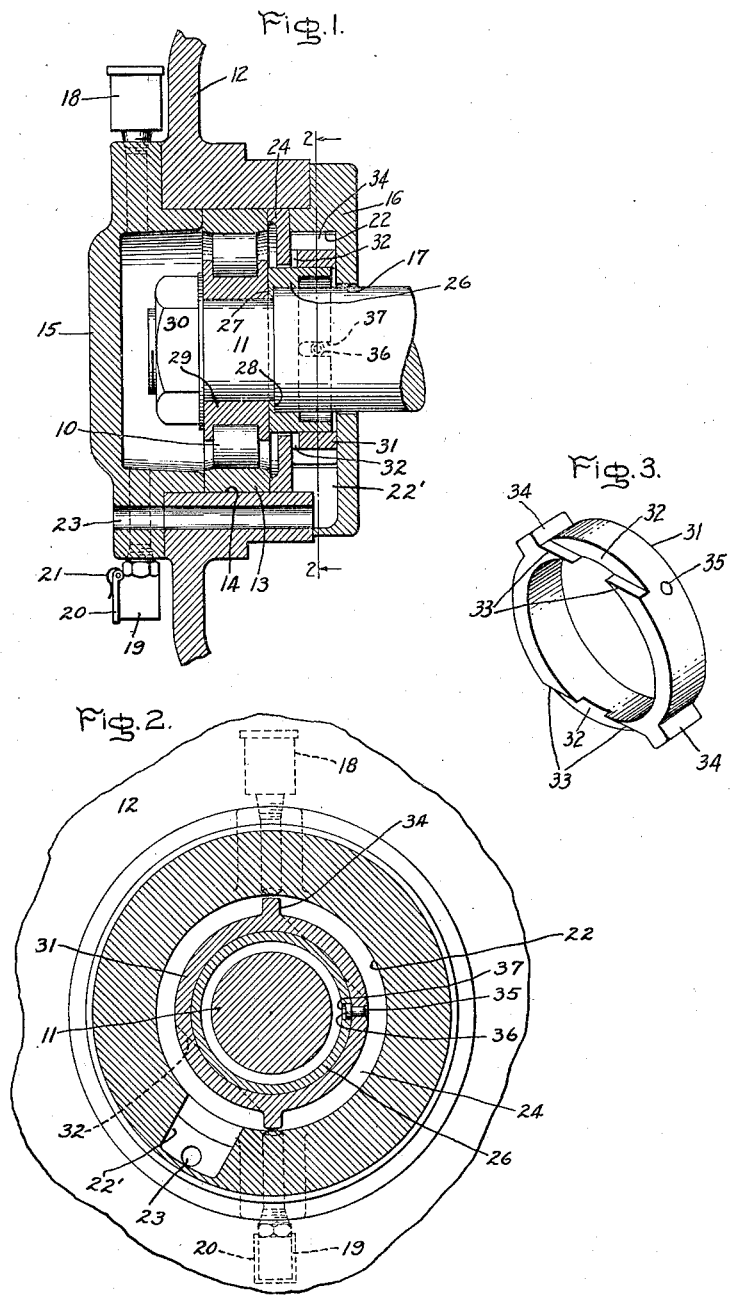
Inventor:
Myles J. Stanton,
by Charles E. Mullar
His Attorney.

Patented Apr. 10, 1934

1,954,685

UNITED STATES PATENT OFFICE 1,954,685

BEARING LUBRICATOR

Myles J. Stanton, Pittsfield, Mass., assignor to General Electric Company, a corporation of New York Application January 18, 1930, Serial No. 421,839

3 Claims. (Cl. 308—134)

My invention relates to bearing lubricators, and has for its object the provision of an arrangement for preventing lubricant passing from the bearing along a shaft supported in the bearing to the portions of apparatus arranged on or about the shaft. I accomplish this object by providing a housing adapted to contain lubricant having an opening therein, a bearing in the housing, a shaft extending through the opening in the housing and supported on the bearing, and a rotatable member arranged in an annular recess between the bearing and the opening in the housing for preventing lubricant passing from the housing along the shaft.

My invention will be more fully set forth in the following description referring to the accompanying drawing, and the features of novelty which characterize my invention will be pointed out with particularity in the claims annexed to and forming a part of this specification.

In the drawing Fig. 1 is a longitudinal section of a bearing lubricator embodying my invention; Fig. 2 is a section on the line 2—2 of Fig. 1, and Fig. 3 is a perspective view of a rotatable member used for forcing lubricant out of the drain passage of the lubricator.

Referring to the drawing, as an example of one manner of carrying out my invention, I have illustrated the same as applied to a roller bearing 10 which supports a motor shaft 11 in the end-head 12 thereof. The outer race 13 of the bearing is arranged in a cylindrical bore 14 in the end-head and closure caps 15 and 16 are secured to the end-head by bolts, the end-head 16 being provided with an opening 17 through which the shaft 11 extends into the housing formed by these parts for enclosing the bearing. The closure cap 15 is provided with a grease cup 18 for supplying grease to the bearing 10 and a pressure relief valve 19 communicating with the housing for preventing the building up of pressure in the housing. This pressure relief valve includes a pivoted plate 20 which is pressed against the outlet of the valve by a spring 21.

In a bearing of this kind grease is often carried along the shaft 11 through the opening 17 and thrown therefrom by centrifugal force into the windings or commutator of the motor and thereby causes trouble. It is therefore desirable to provide some arrangement for positively preventing grease passing from the bearing housing to the inside of the motor. In accordance with my invention I do this by providing an annular recess 22 between the bearing 10 and the opening 17, which communicates with a chamber 22' and a drain passage 23, and arranging a rotatable member in the recess, which is carried by the shaft, for forcing the grease from the annular recess out of the drain passage. In the particular construction illustrated I form the annular recess 22 by clamping a ring 24, and the outer race 13 of the bearing 10 between the closure caps 15 and 16. The inside diameter of the ring 24 is made slightly larger than the opening 17 so as to receive a sleeve 26 having a flange 27 at the end thereof which fits against a shoulder 28 formed on the shaft 11. The flange 27 and the inner race 29 of the bearing 10 are secured between a shoulder 28 and a nut 30 threaded on the shaft 11. The sleeve 26 constitutes an annular enlargement on the shaft 11 so that any grease or lubricant which passes from the bearing toward the opening 17 must pass between the sleeve and the ring 24. In order to prevent the lubricant passing over the sleeve 26 getting out of the housing along the shaft 11, I arrange a rotatable annular member 31 in the annular recess 22 for forcing lubricant therethrough and out of the drain passage 23. This rotatable member is preferably made to slidably fit between the ring 24 and the wall of the closure cap 16 and is formed to provide for the flow of lubricant from the sleeve 26 to the annular recess 22. This may be done in any convenient manner, but I prefer to do it by cutting away the member on the side adjacent the ring 24, as indicated at 32 so as to form an opening having surfaces 33 extending from the sleeve 26 to the outer periphery of the annular member adjacent impeller blades 34, which are fitted in close contact with the side walls of the recess, and which extend closely adjacent the outer periphery of the annular recess 22. The rotatable member is provided with a shouldered pin 35 having head 36 on the inside thereof which fits in a slot 37 formed in the sleeve 26 to form a driving connection with the sleeve.

When the bearing housing is filled with grease, or other suitable lubricant, the pressure will be limited by the relief valve 19. During rotation of the shaft 11 lubricant will be carried along the sleeve 26, but it will not reach the opening 17 so as to be carried along the shaft to the inside of the motor because the surfaces 33 on the rotatable member 31 direct the lubricant into the annular space 22. The impeller blades 34 of the rotatable member 31 then force the lubricant into the chamber 22' and out of the drain passage 23. It is apparent that substantially no lubricant passes between the rotatable member 31 and the closure cap 16 to the shaft 11 because of the action of the impeller blades 34.

Although I have illustrated a particular embodiment of my invention applied to a motor having a roller bearing, I do not desire to be limited to the particular construction shown and described, and I intend in the appended claims to cover all modifications which do not depart from the spirit and scope of my invention.

What I claim as new and desire to secure by Letters Patent of the United States, is:

1. A bearing lubricator including a housing adapted to contain a lubricant and having a drain opening, said housing having a closure cap provided with an opening therein, a bearing in said housing, a shaft extending through the opening in said closure cap into said housing and supported by said bearing, means including a ring arranged between said closure cap and said bearing for providing an annular recess, said ring having an opening therein larger than said shaft, a sleeve arranged in the opening in said ring and carried by said shaft, and an annular member mounted on said sleeve and closely fitted in said recess, said annular member having an impeller blade extending closely adjacent the periphery of said recess and having an opening therein extending from the outer surface thereof to said sleeve to convey lubricant from said sleeve to said impeller blade so as to carry lubricant to the drain opening in said housing.

2. A bearing lubricator including a housing adapted to contain a lubricant, said housing having an opening therein, a bearing in said housing, a shaft extending through the opening in said housing and supported by said bearing, said housing having an annular recess therein between said bearing and the opening, means including a sleeve on said shaft larger than the opening in said housing and rotatable therein for preventing a direct passage of lubricant from said housing along said shaft, an impeller carried by said sleeve and arranged in the annular recess for forcing lubricant from the annular recess out of said drain passage, said impeller being slidably fitted in said annular recess, and means including an outwardly opening passage adjacent said impeller to provide for the flow of lubricant into said annular recess from said sleeve.

3. A bearing lubricator including a housing adapted to contain a lubricant, said housing having an opening therein, a bearing in said housing, a shaft extending through the opening in said housing and supported by said bearing, said housing having an annular recess between said bearing and the opening therein and a drain passage communicating therewith, and an annular member arranged on said shaft and slidably fitted in said annular recess, said annular member having a blade thereon closely fitting the side walls of the annular recess and having surfaces on the side thereof adjacent said bearing for directing lubricant outwardly from said shaft to said blade upon rotation of said shaft in either direction.

MYLES J. STANTON.